UNITED STATES PATENT OFFICE.

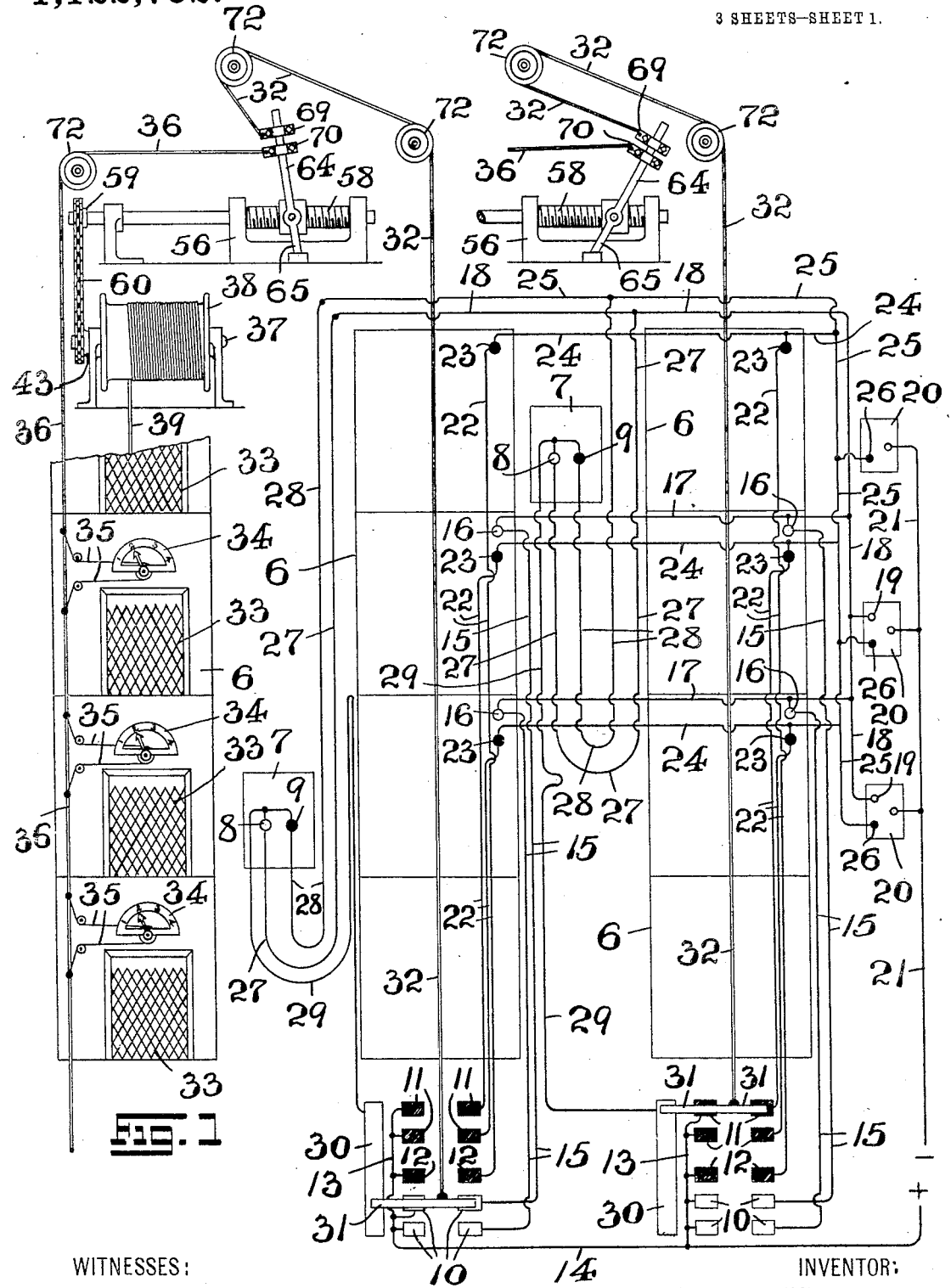

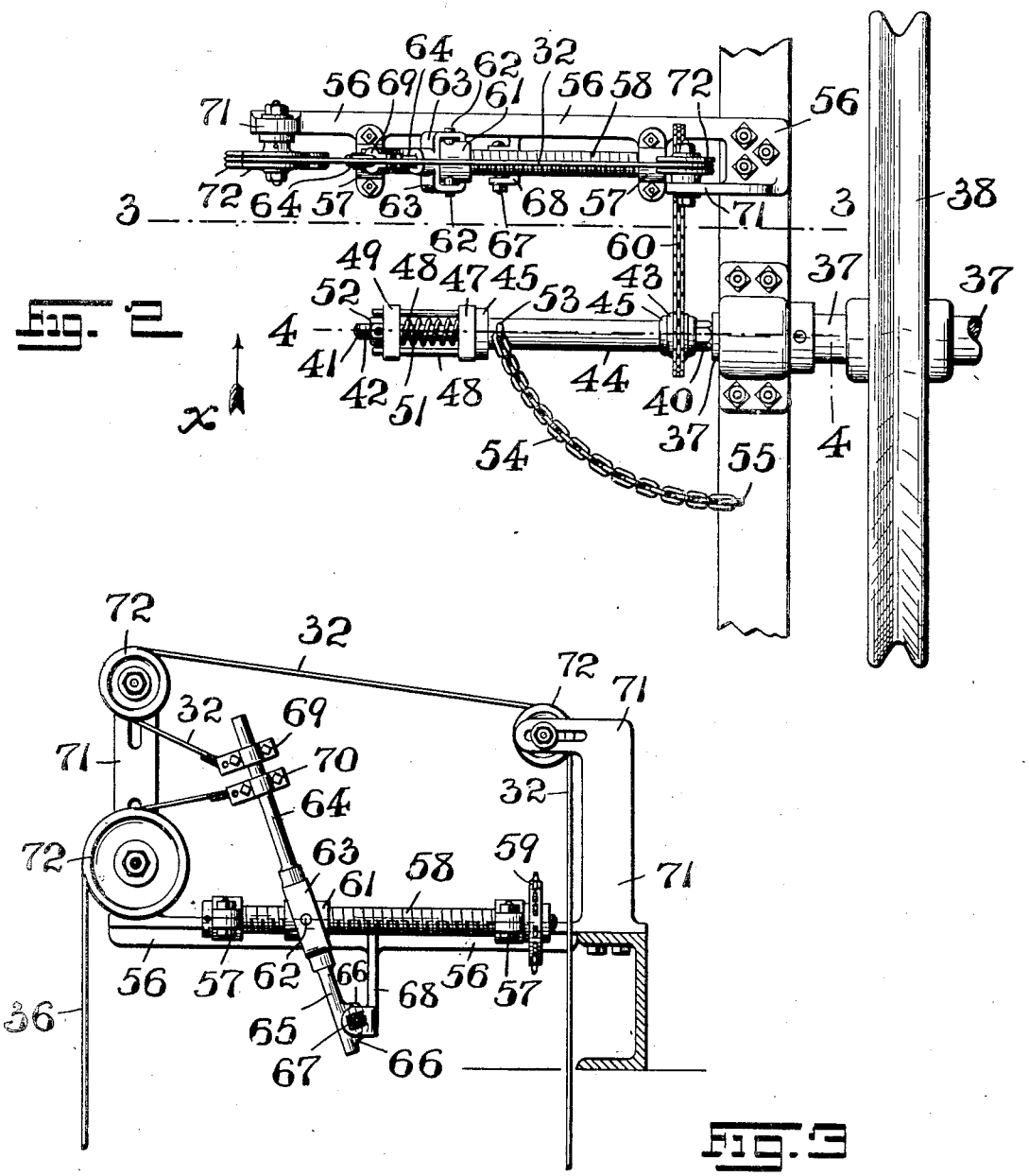

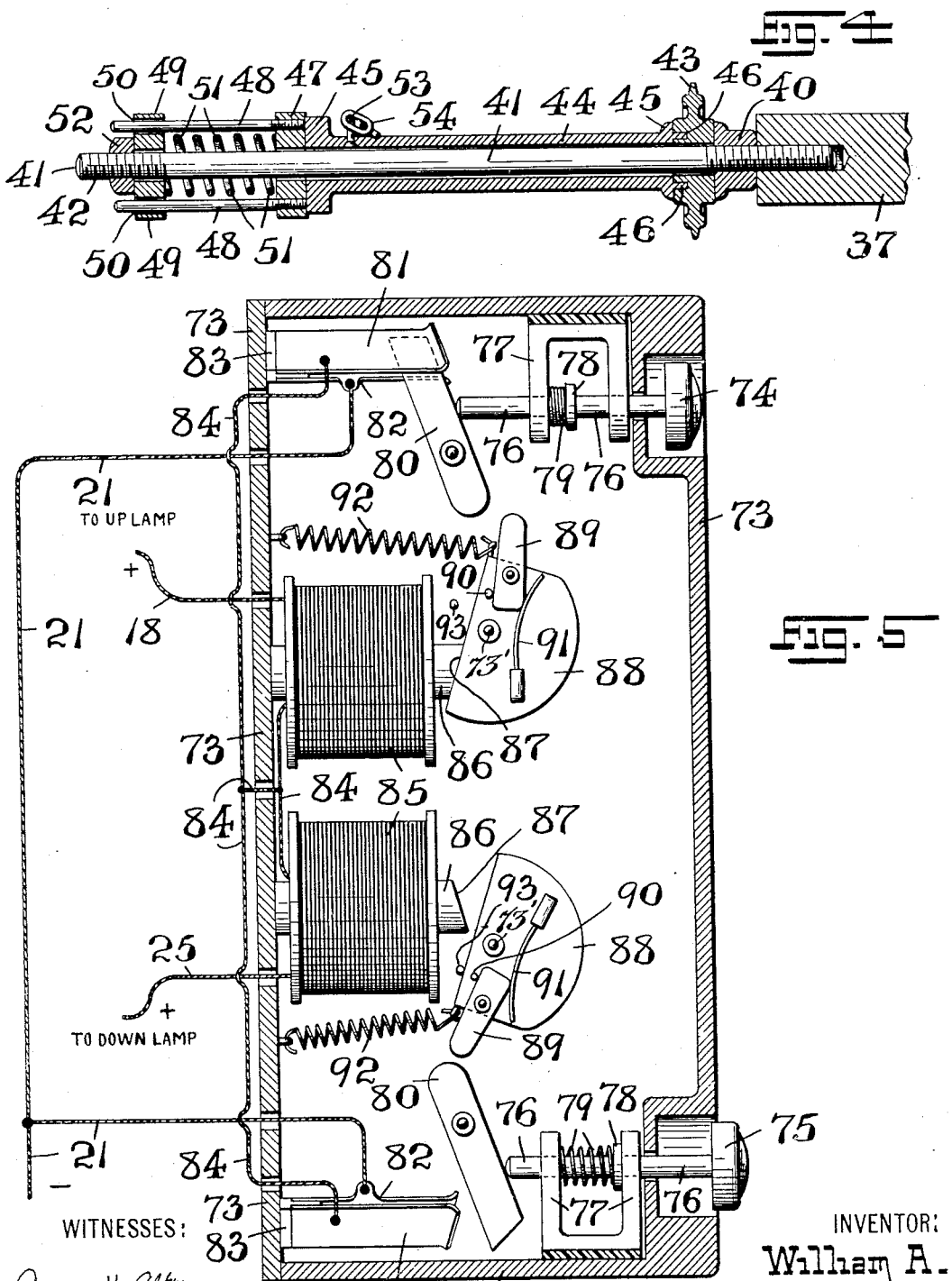

WILLIAM A. HOENEMAN, OF NEW YORK, N. Y.

SIGNALING AND INDICATING SYSTEM FOR ELEVATORS.

1,122,752.        Specification of Letters Patent.     Patented Dec. 29, 1914.

Application filed May 29, 1913. Serial No. 770,581.

*To all whom it may concern:*

Be it known that I, WILLIAM A. HOENEMAN, a citizen of the United States, residing at New York, in the county of New York and State of New York, have invented certain new and useful Improvements in Signaling and Indicating Systems for Elevators; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates to improvements in signaling and indicating apparatus for elevators; and, the invention has for its principal object to provide a signaling apparatus for elevators in which an audible or visible signal is carried by each car, and in which an audible or visible signal is also arranged at the entrance of each elevator-shaft on every floor of the building through which the elevators travel; and, a signal-setting apparatus being provided upon each floor to enable the intending passenger to set the signaling apparatus, so as to cause the operation of said audible or visible signals both in the elevator-car and at the entrance to the elevator-shaft, on the floor from which the passenger signals, as an elevator-car approaches that floor.

The invention has for its further object to provide, in connection with said signaling apparatus, a mechanical indicating-mechanism located above the entrance to each elevator-shaft on every floor, said indicating mechanism being adapted to show the position of each car in its respective elevator-shaft, as well as the direction of its movement.

The present invention has for a further object to provide a novel, simple and effectively operating means for simultaneously operating both the signaling and indicating apparatus, and which is constructed so as to permit of a great delicacy of adjustment, whereby a perfect and simultaneous operation of said signaling and indicating apparatus may be maintained, and whereby it is possible to install said signaling and indicating apparatus in any building, without the use of extra or especially prepared mechanisms, and without regard to the difference of "rise" in various elevator shafts of different buildings.

A still further object of the present invention is to provide in connection with the means for operating said signaling and indicating apparatus, an improved means for assuring the accurate operation of the same, notwithstanding any "slipping" or "creeping" of the sheaves or drums, as the case may be, in their relation to the elevator cables, or other causes which frequently produce trouble or disorder in signaling or indicating systems.

Other objects of the present invention not at this time more particularly described or enumerated will be clearly evident from the following detailed description of my present invention.

With these various objects of my present invention in view, the said invention consists, primarily, in the novel signaling and indicating apparatus for elevators hereinafter set forth; and, furthermore, this invention consists, in the novel arrangements and combinations of the various devices and parts, as well as in the details of the construction thereof, all of which will be hereinafter more fully described and then finally embodied in the clauses of the claims which are appended to and which form an essential part of this specification.

The invention is clearly illustrated in the accompanying drawings, in which:—

Figure 1 is a diagrammatic representation of the signaling and indicating apparatus embodying the principles of my present invention. Fig. 2 is a detail plan view of the means for operating the same. Fig. 3 is a detail longitudinal vertical section of said operating means, taken on line 3—3 in said Fig. 2, and looking in the direction of the arrow *x*. Fig. 4 is a detail longitudinal vertical section of the means for compensating for the "slipping" or "creeping" of the sheaves or drums in their relation to the elevator cables, said section being taken on line 4—4 in said Fig. 2. Fig. 5 is a semi-diagrammatic view of the signal-setting apparatus, which is located upon each floor of the building, to enable the intending passenger to signal the said elevator-cars.

Similar characters of reference are employed in all of the above described views, to indicate corresponding parts.

Referring now to the said drawings, the reference-character 6 indicates two or more elevator-shafts, in which are operatively arranged the respective elevator-cars 7. Each car is provided with an audible or visible up-signal 8 and an audible or visible down-signal 9. Arranged at the foot of each elevator-shaft 6, or in any other convenient location, is a switching apparatus comprising a series of up-contacts 10, arranged in pairs to correspond with the number of floors equipped with up-signal apparatus, said apparatus comprising also a series of down-contacts 11, arranged in pairs to correspond with the number of floors equipped with down-signal apparatus, and comprising also a pair of neutral-contacts 12 adapted to be connected with the signal-apparatus of the top floor of the building. One of each pair of up-contacts, down-contacts and neutral contacts are electrically connected by means of circuit-wires 13 with an electrical conductor 14, the same being connected with the positive pole of a main source of electricity. One of each pair of up-contacts 10 are electrically connected by means of wires 15 to one pole of an audible or visible up-signal 16 located on all floors with the exception of the top and bottom floors at the entrances to said elevator-shafts. The other pole of each of the said up-signals 16 is connected, by means of wires 17, to a wire 18 leading from the up-circuit closer 19 of a signal-setting apparatus 20. Said signal-setting apparatus 20 is electrically connected, by means of wires 21, with the negative pole of an electrical source. In like manner, one of each pair of down-contacts 11 and neutral-contacts 12 are electrically connected by means of circuit-wires 22 to one pole of an audible or visible down-signal 23 located on all floors except the bottom at the entrance to said elevator-shafts. The other pole of each of said down-signals 23 is connected, by means of wires 24, to a wire 25 leading from the down-circuit closer 26 of said signal-setting apparatus 20. One pole of the up-signal 8 of each elevator-car 7 is connected by means of wires 27, to the said wire 18 leading from the up-circuit closer 19 of said signal-setting apparatus 20, while one pole of the down-signal 9 of each elevator-car 7 is connected, by means of wires 28, to said wire 25 leading from the down-circuit closer 26 of said signal setting apparatus 20. The other poles of said up-signals 8 and down-signals 9 of each car 7 are connected, by means of wires 29, to a contact-strip 30, forming a part of the switching-apparatus hereinabove mentioned. The said up-contacts 10, down-contacts 11, and neutral-contacts 12, are adapted to be properly closed in circuit with said contact-strip 30, synchronously with the movement of said elevator-car 7 in its shaft 6, by means of a traveling contact-piece 31, which is adapted to be operated by a snake-wire 32, or the like.

The reference-character 33 indicates the various entrances to the elevator-shaft on each floor, and arranged above each entrance is a mechanical indicator 34, the same being adapted to indicate the position of each elevator-car 7 in its respective elevator-shaft 6. The said indicators 34 are operated by means of any well-known construction of snake-device 35 which is in turn operated by snake-wires 36, or the like. The means for operating the said snake-wires 32 and 36, comprises the following apparatus. Connected with the shaft 37, upon which is mounted a drum or sheave 38, as the case may be, and over which the elevator-cables 39 travel, preferably by being screwed into a screw-threaded opening therein and securely held by a lock-nut 40, is a small-shaft 41, the free end of which is provided with screw-threads 42. Loosely mounted upon said small shaft 41 is a sprocket-wheel 43 which is arranged against the outer face of the said lock-nut 40. Slidably arranged upon said shaft 41 is a cylindrical sleeve 44 which is provided with flanged ends 45, and one end of which is further provided with a pair of pins or projections 46 adapted to fit into a corresponding number of receiving depressions in said sprocket-wheel 43. Arranged against the face of the outer flange of said cylindrical sleeve 44 is a tension device, said device comprising a block 47 slidably arranged upon said shaft 41, the same being provided with guide pins 48; and, in like manner, there is arranged upon said shaft 41 another block 49 provided with perforations 50 adapted to receive the free ends of said guide-pins 48 of the block 47. Arranged around the shaft 41, between the opposite faces of said blocks 47 and 49, is a coiled spring 51, and secured upon the screw-threaded end 42 of said shaft 41 is a nut 52, by means of which the tension of said coiled spring 51 may be increased or diminished at will. Secured, in any suitable manner, to said cylindrical sleeve 44 is an anchor-link 53 to which is attached one end of a chain 54, or other flexible connection, the other end of which is attached to another anchor-link 55 secured at any suitable stationary point, preferably the foundation framework which supports said drum or sheave. Suitably secured to the foundation framework which supports the said drum or sheave is a bracket or member 56 provided with bearings 57 in which is rotatably mounted a worm 58, the same being rotated by means of a sprocket-wheel 59 secured to the free end thereof, and said sprocket-wheel 59 being connected with said sprocket-wheel 43 by means of a chain drive 60, for operating the same. Operatively arranged upon said worm 58 is a traveling-nut 61 which is provided with a pair of oppositely extending studs 62 upon which is pivotally mounted a yoke-member 63, the latter being provided with an upwardly extending arm 64 and a downwardly extending arm 65. The said downwardly extending arm 65 is provided with a slotted projection or lug 66, through which passes a pin or bolt 67 carried by a bracket or extension 68, said pin or bolt 67 forming a fulcrum for the lever-member or element formed by said arms 64 and 65 and said yoke-member 63. The said slotted projection or lug 66 permits the free action, without binding, of the said lever-member when the same is moved back and forth by said traveling-nut 61. Adjustably arranged upon the upwardly extending arm 64 are a pair of clamping members 69 and 70 to which are respectively secured the ends of said snake-wires 32 and 36. The said bracket or member 56 is provided with suitably located bracket-arms 71 to which are adjustably secured guide-wheels 72, over which said snake-wires 32 and 36 are respectively carried to their operative positions in the elevator-shaft or elsewhere.

It will be clearly understood that the backward and forward movements of said traveling-nut 61, upon the worm 58, causes a corresponding backward and forward movement of said upwardly extending arm 64, whereby the said snake-wires 32 and 36 are respectively raised and lowered synchronously with the corresponding movements of the elevator-car in its shaft, thus providing for a proper operation of the several mechanisms connected respectively with said snake-wires.

A very important and distinct advantage which this construction of apparatus provides is found in the ease with which the movement of the said snake-wires may be adjusted to meet almost any condition of elevator-shaft. This result is accomplished by simply shifting the said clamping members 69 and 70 up or down upon said upwardly extending arm 64 until the movement of the snake-wires attached thereto is properly adjusted and regulated synchronously with relation to the movement of the elevator-car. This simple but important expedient practically makes this power or driving-mechanism standard, and very easy to install under various and changing conditions met with in different buildings; and, furthermore, it does away with the necessity of planning special combinations of sprockets and chains or gear-drives to secure the desired uniform pull and movement for the right operation of the snake-wires, whenever any changed condition in the building, in which the elevators are being installed, is met with. A further important feature of my invention, which the use of the construction of snake-operating mechanism provides, is the ability to operate therewith simultaneously both the signaling and indicating apparatus, this result being new in the art of elevator signal construction.

Referring again to Figs. 2 and 4 of the accompanying drawings, it will be clearly evident, that the tension of said coiled spring 51 will exert a pressure upon the block 47, the pressure being transmitted through said cylindrical sleeve 44 to the sprocket wheel 43 which is thereby forced into strong and positive frictional engagement with the face of said lock-nut 40, so that the said sprocket-wheel is caused to turn with the shaft 41 and thereby drives the snake-wire operating mechanism hereinabove described. The chain 54 is so adjusted, as to its length, that it will completely reel or wind upon the cylindrical sleeve 44 whenever the elevator-car reaches the top or bottom of its shaft; and, being anchored to the foundation frame-work, supporting either said sheave or a drum, it securely retains against any further movement the said cylindrical sleeve 44 and the sprocket wheel 43, even though the car should travel slightly beyond the bottom or top level of the shaft. This is also the case, should there occur some slight "slipping" or "creeping" of the sheave and its shaft 37, whereby they continue slightly their revolution, in which event the said shaft 37 and the small shaft 41 connected therewith would simply rotate slightly within the stationary sleeve 44 and sprocket wheel 43. By this means the snake-wire-operating mechanism is always maintained and adjusted automatically to its proper synchronous movement in relation to the movements of the said elevator-car in its shaft.

Referring, more particularly, to Fig. 5 of the accompanying drawings, there is illustrated therein a signal-setting apparatus which is adapted to be located upon each floor of the building to serve as a means for an intending passage to set the audible or visible signals in an elevator-car, and on a required floor, whereby the elevator-operator or conductor may be notified when approaching the floor that a passenger wishes to ascend or descend, as the case may be. This signal-setting apparatus comprises a suitable box or casing 73, provided with an up push-button 74 and a down push-button 75. Each of said push-buttons are provided with a shank 76, which is slidably supported by means of a suitable bearing-member 77, suitably insulated from said box or casing 73. Each shank 76 is further provided with a shoulder or collar 78, and arranged upon said shanks, between the said shoulder or collar 78 and an arm of said bearing-member 77, is a coiled spring 79 which serves to return the push-buttons to their normal initial positions after they have been pressed by a passenger. Arranged within said box or casing 73 is an up-circuit closer and a down circuit-closer which comprises a swinging contact-blade 80, pivotally mounted in said box or casing 73, and a pair of contact receiving-blades 81 and 82 secured upon and electrically separated by a suitable block of insulating material 83. Each contact receiving-blade 81 is electrically connected by means of circuit-wires 84 with the negative poles of a pair of electro-magnets 85. The positive pole of one of said electro-magnets 85 is electrically connected with the wire 18 which leads to the audible or visible up-signals in the elevator cars, as well as at the entrances to said elevator-shafts, while the positive pole of the other of said electro-magnets 85 is electrically connected with the wire 25 which leads to the audible or visible down-signals in the elevator-cars as well as at the entrances to said elevator-shafts, as has been herein-above described. Each contact receiving-blade 82 is electrically connected by means of a wire 21 with the negative pole of an electrical source. Each of said electro-magnets 85 is also provided with a suitable core 86 having a chamfered end 87, and pivotally arranged upon a post 73' within said box or casing 73 are a pair of armature-pieces 88 adapted to properly coact with said electro-magnets. Pivotally connected with each armature-piece 88 is a trip-pawl 89, the same being maintained in its normal position against a stop 90, by means of a suitable spring 91. Secured to each armature-piece 88 is a coiled spring 92, the opposite end of which is anchored to the box or casing 73. This spring 92 tends to return said armature-piece 88 to its normal initial position, against a stop-pin 93, when the same is released from magnetic contact with said electro-magnets 85.

The operation of the said signal-setting apparatus is as follows:—When, for example, the up push-button 74 is pressed inwardly, the free end of its shank presses against the swinging contact-blade and forces the same in between and in contact with the pair of contact receiving-blades 81 and 82, thus bringing the gap between them, and thus preparing the up-signal circuit to be closed when the traveling contact-piece 31, of the above described switching apparatus, is brought in contact with the up-contacts corresponding to the floor upon which said signal-setting apparatus has been operated, and with the contact-strip 30 of said switching apparatus, this condition being accomplished, as an elevator car rises in its shaft toward that floor, by means of said snake-wire 32, which operates said traveling contact-piece 31. When the circuit is thus closed, the up-signals in both the elevator-car and at the entrance to the elevator-shaft thereof operate, and at the same time, the electrical current is caused to pass through one of the electro-magnets 85, thereby drawing to its core 86, the movable armature-piece 88, the trip-pawl 89 of which passes over the end of said swinging contact-blade 80. In this manner, said trip-pawl 89 is brought in position so to engage positively with said swinging contact-blade 80 upon the return movement of said armature-piece 88. After the elevator-car has thus been signaled to stop at the desired floor, has done so, and then again resumes its upward travel, the said traveling contact-piece 31 is carried away from the up-contacts of the switching-apparatus, and the electrical circuit is broken. The electrical-circuit thus being broken, the electro-magnet 85 ceases to hold said armature-piece 88 against its core 86 and permits the spring 92 to cause its return to its normal initial position; and, in so doing, the trip-pawl 89 is brought in operative engagement with said swinging contact-blade 80, whereby the same is forced away from its contact with said contact receiving-blades 81 and 82 and is caused to resume its normal initial position, ready to be again operated by the up-push-button 74. It will be clearly understood that the down-push button 75, operating through similar devices, accomplishes all of the above described results with respect to the down-signals in said elevator-cars and at the entrances to said elevator-shafts.

The switching apparatus above referred to is shown in said Fig. 1, diagrammatically, but it will be clearly evident, that many mechanical arrangements designed to be operated by a snake-wire, embodying the principles of my invention as applied to my general system of signaling apparatus, may be devised. Hence, I do not show in detail, nor do I claim any specific construction of such device.

I claim:

1. The combination with a signaling mechanism for elevators of a snake-wire for operating the same, a rotating worm, a traveling-nut operated by said worm, a pivotally connected oscillating arm operated by said traveling-nut, and adjustable means for securing said snake-wire to said oscillating arm, substantially as and for the purposes set forth.

2. The combination with one or more elevators, of mechanical indicating apparatus for indicating the position of the car in the shaft, an electrical signaling apparatus provided with make and break switching devices for signaling the car from any floor, a snake-wire for operating said mechanical indicating apparatus, a snake-wire for operating said make and break switching devices of said signaling apparatus, and means for simultaneously operating said snake wires synchronously with relation to the movements of the elevator-cars, comprising, a worm, a traveling-nut operated thereby, an oscillating arm operated by said traveling-nut, and adjustable means for separately securing said snake-wires to said oscillating arm, substantially as and for the purposes set forth.

3. The combination with one or more elevators, of mechanical indicating apparatus for indicating the position of the car in the shaft, an electrical signaling apparatus provided with make and break switching devices for signaling the car from any floor, a snake-wire for operating said mechanical indicating apparatus, a snake-wire for operating said make and break switching devices of said signaling apparatus, a rotating worm driven from the shaft of an elevator-sheave or drum, a traveling-nut operated by said worm, an oscillating-arm operated by said traveling-nut, and clamping devices adjustably connected with said oscillating-arm for separably securing said snake-wires to said oscillating-arm, substantially as and for the purposes set forth.

4. The combination with one or more elevators, of mechanical indicating apparatus for indicating the position of the car in the shaft, an electrical signaling apparatus provided with make and break switching devices for signaling the car from any floor, a snake-wire for operating said mechanical indicating apparatus, a snake-wire for operating said make and break switching devices of said signaling apparatus, a rotating worm driven from the shaft of an elevator-sheave or drum, a traveling-nut operated by said worm, an oscillating arm operated by said traveling-nut, and clamping devices adjustably connected with said oscillating-arm for separately securing said snake-wires to said oscillating-arm, and means for maintaining a perfect synchronous movement of said snake-wires with relation to the movements of the elevator-cars, substantially as and for the purposes set forth.

5. The combination with one of more elevators, of mechanical indicating apparatus for indicating the position of the car in the shaft, an electrical signaling apparatus provided with make and break switching devices for signaling the car from any floor, a snake-wire for operating said mechanical indicating apparatus, a snake-wire for operating said make and break switching devices of said signaling apparatus, a sheave or drum having an extended shaft, a fixed nut on said shaft, a sprocket wheel loosely mounted on said shaft, a cylindrical-sleeve connected with said sprocket-wheel, a tension device adapted to normally force said sleeve and sprocket-wheel in frictional engagement with said fixed nut, a chain connected at one end to said sleeve and anchored at the other end to a fixed point, said chain being adapted to completely reel upon said sleeve when the elevator-car reaches the top or bottom level of its shaft, a rotating worm provided with a driving sprocket, a drive chain between said first mentioned sprocket-wheel and said drive sprocket, means for supporting said worm, a traveling-nut operated by said worm, an oscillating arm operated by said traveling-nut, and adjustable means for separately securing said snake-wires to said oscillating-arm, substantially as and for the purposes set forth.

6. The combination with one of more elevators, or indicators, snake-wires for operating said indicators, means for operating said snake-wires synchronously with relation to the movements of the elevator-cars, comprising a rotating worm, a traveling-nut operated by said worm, an oscillating arm operated by said traveling nut, and an adjustable clamping device for securing a snake-wire to said oscillating-arm, substantially as and for the purposes set forth.

7. The combination with one or more elevators, of electrical signaling apparatus having make and break switching devices, snake-wires for operating said make and break switching devices, and means for operating said snake-wires synchronously with relation to the movements of the elevator-cars, comprising a rotating worm, a traveling nut operated by said worm, an oscillating arm operated by said traveling-nut, and an adjustable clamping device for securing a snake-wire to said oscillating arm, substantially as and for the purposes set forth.

8. The combination with snake-wires for operating the signaling and indicating mechanisms of elevators, of means for maintaining the synchronous movement of said snake-wires with relation to the movement of the elevator-cars, comprising, a sheave or drum having an extended shaft, a fixed nut on said shaft, a sprocket-wheel loosely mounted on said shaft, a cylindrical sleeve connected with said sprocket-wheel, a tension device adapted to normally force said sleeve and sprocket wheel in frictional engagement with said fixed nut, a chain connected at one end to said sleeve and anchored at its other end to a fixed point, said chain being adapted to completely reel up on said sleeve when the elevator car reaches the top or bottom level of its shaft, a worm, means connected with said sprocket-wheel for driving said worm, a traveling-nut on said worm, an oscillating arm operated by said traveling-nut to which said snake-wires are respectively connected, substantially as and for the purposes set forth.

In testimony, that I claim the invention set forth above I have hereunto set my hand this 26th day of May, 1913.

WILLIAM A. HOENEMAN.

Witnesses:
GEORGE D. RICHARDS,
ADOLPH HANSEN.

Copies of this patent may be obtained for five cents each, by addressing the "Commissioner of Patents, Washington, D. C."